April 21, 1942.  J. M. MILAN  2,280,599
VEHICLE BRAKE
Filed Nov. 6, 1939  3 Sheets-Sheet 1
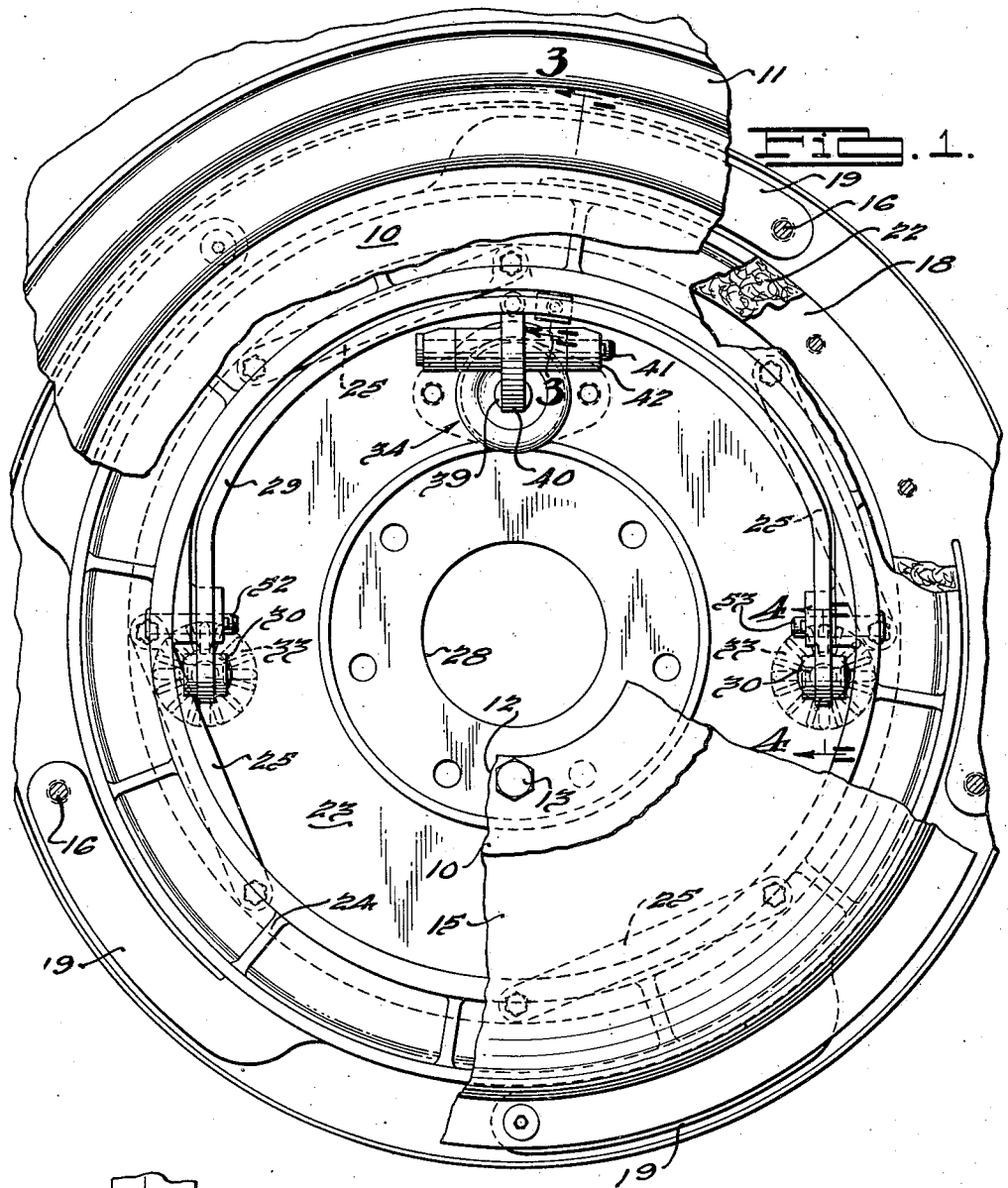
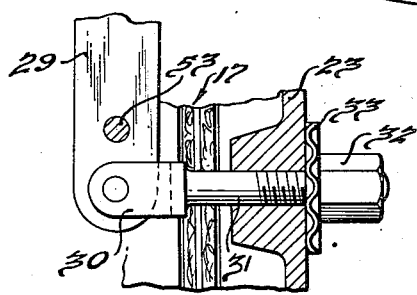
INVENTOR
Joseph M. Milan
BY
ATTORNEYS.

April 21, 1942.  J. M. MILAN  2,280,599
VEHICLE BRAKE
Filed Nov. 6, 1939   3 Sheets-Sheet 2
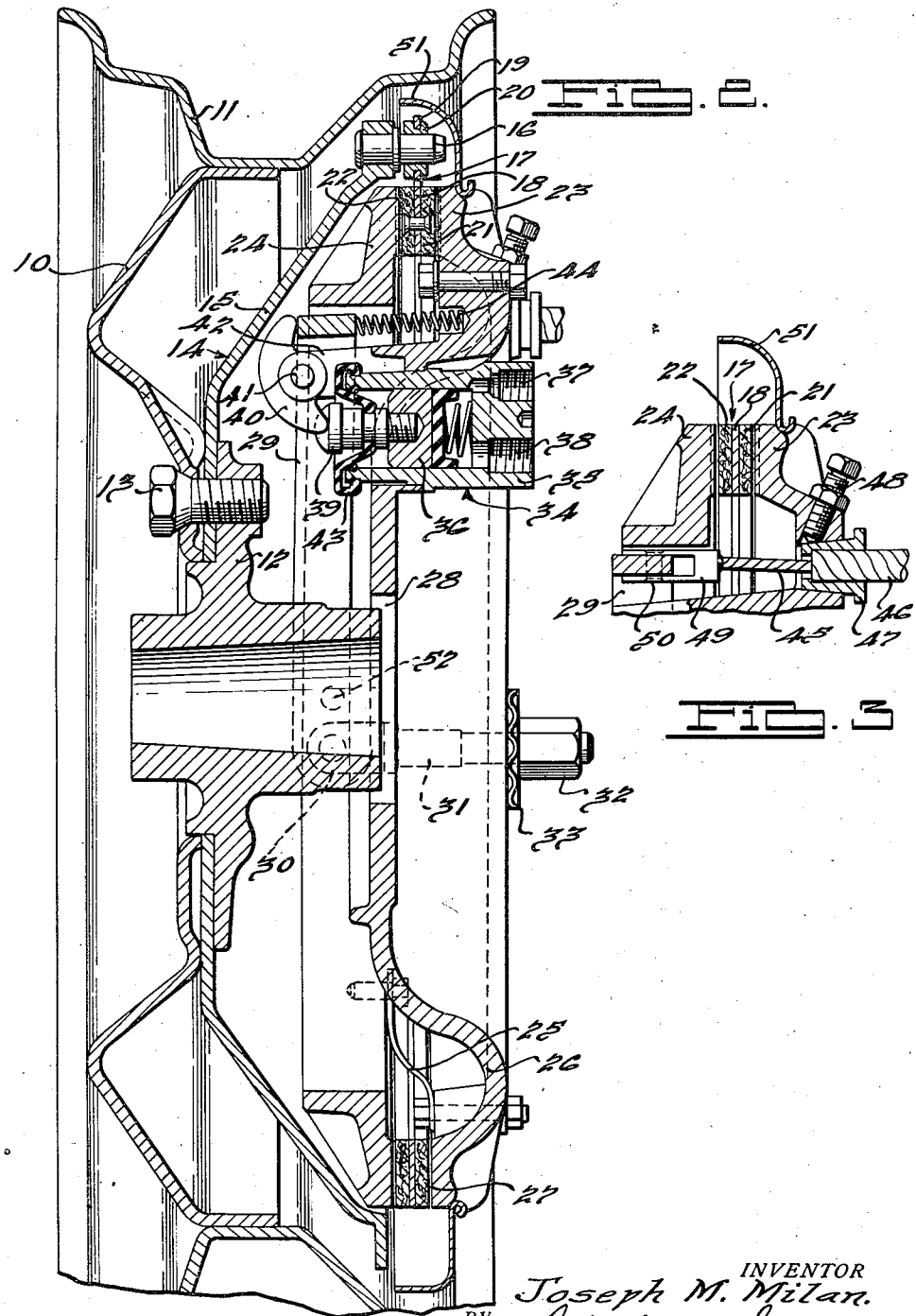

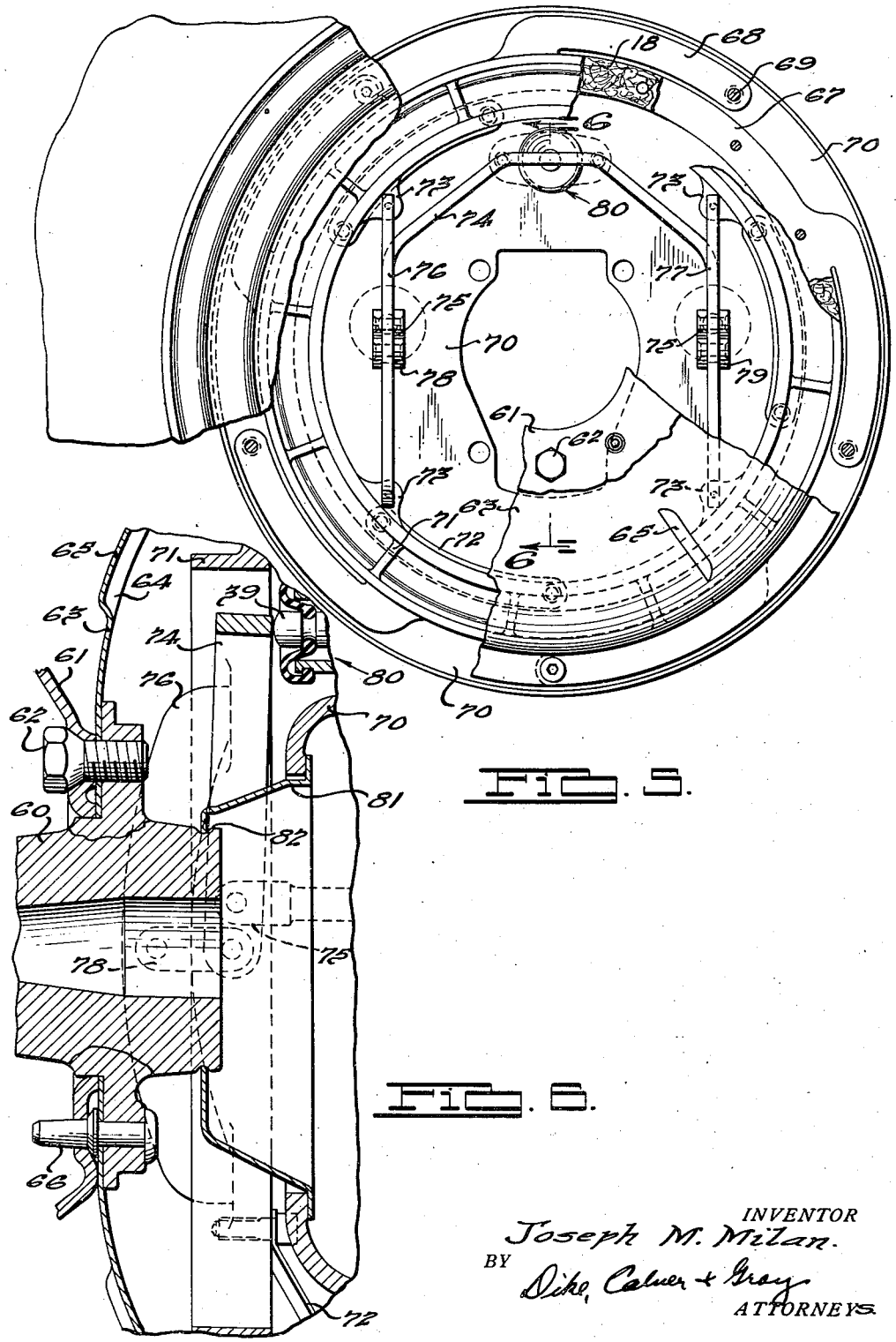

Patented Apr. 21, 1942

2,280,599

UNITED STATES PATENT OFFICE 2,280,599

VEHICLE BRAKE

Joseph M. Milan, Highland Park, Mich.

Application November 6, 1939, Serial No. 302,966

14 Claims. (Cl. 188—72)

The present invention relates to vehicle brakes and particularly to that class of vehicle brake commonly referred to as a disk brake.

It is a principal object of the present invention to provide a vehicle disk brake in which the brake operating means are operated selectively by separate brake applying systems to provide for either hydraulic of mechanical actuation thereof It is a further object of the invention to provide a vehicle disk brake in which the forces generated on application of the braking pressures are distributed to a plurality of points on the pressure plate and backing plate, thereby reducing the tendency of such plates to "buckle" or "warp" upon actuation of the brake.

A further object of the invention is to provide a vehicle disk brake in which the pressure plate is resiliently mounted on the backing plate for limited axial and circumferential movement relative thereto.

Another object of the invention is to provide a vehicle brake of the disk type which is of simplified construction, positive in operation, and which has a relatively long operating service life with the minimum of required adjustments but which may be readily serviced and adjusted while in use.

This application is related to my co-pending application for Vehicle brake, Serial No. 302,967, filed November 6, 1939.

Other objects and advantages of this invention will appear in the following description and appended claims, reference being had to the accompanying drawings forming a part of this specification, wherein like reference characters designate corresponding parts in the several views.

A vehicle brake embodying the present invention is shown by way of example in the accompanying drawings, in which:

Fig. 1 is a fragmentary elevation of a vehicle brake embodying the present invention showing a fragmentary portion of the vehicle wheel, parts of the wheel and brake being broken away to show the interior construction of the brake mechanism;

Fig. 2 is an enlarged section of the brake embodying the present invention and showing a fragmentary section of the vehicle wheel;

Fig. 3 is an enlarged fragmentary section taken substantially on the line 3—3 of Fig. 1 in the direction of the arrows;

Fig. 4 is an enlarged fragmentary section taken substantially on the line 4—4 of Fig. 1 in the direction of the arrows;

Fig. 5 is an elevation with parts broken away of a modified form of brake embodying the present invention; and Fig. 6 is an enlarged section taken substantially on the line 6—6 of Fig. 5 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A disk brake embodying the present invention is adapted for use on the rotating wheels or other parts of any desired type of vehicle. In the embodiment shown in the accompanying drawings the brake is of a type constructed for use on the front wheels of an automobile. It is to be understood, however, that the invention herein disclosed is not to be thereby limited to such use since changes within the purview of a mechanic skilled in the art may be readily made in the structural features of the brake which are required to mount it in position for any desired use, it being understood that the mechanical operative features of the brake will be substantially unchanged in the various uses to which the brake may be put, the changes required to adapt it to particular uses being chiefly in connection with the method of mounting the brake on the part with which it is to be used. In this connection it is to be observed that the brake consists essentially of four elements—the backing plate which is secured to a non-rotating part, the pressure plate mounted on the backing plate but movable relative thereto, the friction disk suspended between the adjacent faces of the backing plate and the pressure plate, and the brake applying means carried by the backing plate and operable to move the pressure plate toward the backing plate and into braking engagement with the friction disk carried by the rotating part. Thus it will be seen that the brake may be applied to any rotating part and that while the brake is particularly designed for use on the wheels of wheeled vehicles, it may likewise be applied to the general class of shaft brakes.

Referring to the drawings and particularly to Figs. 1 and 2, the numeral 10 designates a vehicle wheel of any desired construction, and 11 a tire-carrying rim carried by the wheel. The wheel 10 is secured to the hub 12 by means of a plurality of wheel studs 13. A spider 14 is secured to the hub 12 and has an inwardly inclined portion 15 terminating in a peripheral flanging or rim carrying a stud 16 which extends substantially at right angles to the plane of the face of said flanging. However, the spider 14 need not be of a solid or continuous construction. Instead, a plurality of radial arms may extend from the central portion thereof which is fastened to the hub 12. Each of these arms may terminate in an end portion carrying one of the studs 16. If desired, the spider 14 may be eliminated and an air induction disk, such as for example as the disk shown and claimed in my co-pending application Serial No. 302,967, may be substituted therefor.

A friction disk 17 is slidably mounted on the stud 16 and comprises a plate 18 having a plurality of resilient tangential arms 19 each having in its free end a grommetted opening 20 for engagement with one of the studs 16. The disk 17 is provided with friction disks 21 and 22 which are secured on opposite sides of the plate 18, as for example by riveting. The friction disks 21 and 22 are adapted respectively to be engaged frictionally by adjacent faces of the backing plate 23 and the pressure plate 24. The pressure plate 24 is resiliently mounted on the backing plate 23 by a plurality of resilient torque arms 25 which as here shown are in the form of resilient spring strap members each having one end secured to the backing plate 23 and the other end secured to the pressure plate 24, to thereby permit limited axial and circumferential movement of the pressure plate relative to the backing plate.

In the present embodiment of the invention the backing plate 23 is formed as a casting having a circumferentially dished or bowed portion 26 on which is provided the friction braking surface 27. An annular opening 28 is provided for mounting the backing plate 23 over the steering spindle and stub axle (not shown). By this construction it is possible to secure adequate support for the braking surface 27 with a relatively lightweight backing plate and to so support the braking surface 27 that it is not thrown out of alignment upon the application of the brake.

The brake applying mechanism which moves the pressure plate 24 relative to the backing plate 23 consists of a yoke 29 pivotally mounted on a plurality of brackets 30 carried on the backing plate 23, each bracket 30 having a shank 31 which terminates in a threaded end portion which extends through the opposite face of the backing plate 23 and is there engaged by the adjusting nut 32. The adjustment of the adjusting nut 32 is held by the adjusting locking nut washer 33. This construction is shown in detail in Fig. 4 and as there shown it will be seen that adjustment of the locking nut 32 will vary the distance of the pivot points of the yoke 29 relative to the backing plate 23 and thus control the distance of travel of the yoke 29 and the distance through which the pressure plate 24 may be moved by said yoke. The yoke 29 may be actuated by any desired type of brake actuating mechanism controlled from the brake controlling means within the vehicle (not shown). In the present embodiment the brake pedal or other actuating lever is connected with a conventional type of hydraulic master cylinder (not shown) and lines therefrom lead to the hydraulic cylinder 34 which comprises a shell 35 which is mounted in the backing plate 23 and a piston 36 which is movable in said shell 35. The piston 36 is moved in the shell 35 in response to pressures of the hydraulic fluid which is supplied to and withdrawn from the interior of the shell 35 through the port 37. The port 38 provides a means for bleeding the cylinder if required.

The piston 36 carries a stud 39 which as here shown contacts one arm of a rocker 40 which is pivotally mounted on a shaft 41 which is supported on brackets 42 which are formed integrally with the backing plate 23. One arm of the rocker member 40 contacts the stud 39 and the other end contacts the yoke 29 so that upon pivotal movement thereof due to the outward movement of the stud 39 the end in contact with the yoke 29 causes the upper portion of the yoke to move in the direction of the backing plate 23. A dust cap 43 formed of rubber or similar resilient material is provided on the shell 35 and effectively seals the cylinder against dust, dirt and similar foreign materials.

A spring 44 is provided between the backing plate 23 and the yoke 29 and assists in releasing the brake pressure and returning the parts to their normal inoperative positions upon release of the braking pressures.

In the embodiment of the invention here shown the brake is adapted also to be actuated by a mechanical brake actuating system, it being intended that the hydraulic system above described shall be operated by the conventional type of brake foot pedal while the mechanical system will be connected with the conventional hand operated brake lever which forms the emergency brake system for the vehicle. It is to be understood, however, that the brake need not be connected to both the hydraulic and the mechanical actuating systems but may be connected to either of them and be successfully operated therefrom. Referring to Fig. 3, it will be seen that the connection between the brake mechanism and the mechanical brake operating system consists essentially of a brake actuating cable 45 or similar mechanical brake applying means. In this instance the cable 45 is provided with a flexible covering 46 which is secured in a grommet 47 which is adjustably held in position in a recess provided in the backing plate 23 by the adjustable set screw 48. The end of the cable 45 adjacent the yoke 29 is provided with a clevis 49 which is pivotally connected by the clevis pin 50 to the top portion of the yoke 29 at one side of the point at which the rocker arm 40 contacts the surface of the yoke 29. Thus it will be seen that the brake mechanism of the present invention may be connected with the two separate systems and may be selectively applied by the actuation of either system. Thus in the event that there is a "wash out" or failure of the hydraulic actuating means, the mechanical actuation of the brake may be relied upon to secure its operation.

The brake mechanism is sealed against foreign material such as dirt, dust, water, oil, etc. by means of an annular removable dust ring or guard 51 which, as here shown, is secured to the backing plate and extends over the outer circumference of the friction disk member 17. The yoke 29 is connected with the pressure plate 24 by studs or pins 52 and 53 which are carried on the pressure plate 24 and are connected with the yoke 29. Thus upon pivotal movement of the yoke 29 about the pivot point in the brackets 30, a pressure is exerted on the pins or studs 52 and 53 and the braking pressure is applied to the pressure plate 24 at a plurality of spaced points. This secures an equalization of the braking pressures on opposed sides of the pressure plate 24 and thus assists in preventing the bending or warping of the plate upon the application of the braking pressures thereto.

In certain uses of the invention it is desirable to secure a further distribution of the braking pressures to an additional plurality of points on the pressure plate. This is particularly true in brakes designed for heavy duty use, such for example as on trucks, trailers and other similar types of vehicles.

A modified form of construction embodying the present invention and which is designed to adapt the brake particularly to such use, is shown in Figs. 5 and 6. As there shown, the hub 60 has a wheel 61 removably connected thereto by a plurality of wheel studs 62. A brake disk carrier 63 is secured to the hub 60 for rotation therewith and as here shown is in the form of an air induction member similar to that disclosed and claimed in my co-pending application Serial No. 302,967. The air induction member is provided with a plurality of inlet ports 64 each having an air scoop 65 adjacent thereto. A plurality of wheel locating studs 66 are carried on the hub 60 and assist in locating the wheel in the desired predetermined position thereon.

The friction brake disk 67 is carried on the carrier 63 and is provided with a plurality of resilient tangential arms 68 which are connected on their free ends by bolts 69 or similar means at spaced points on the circumference of the carrier 63. A backing plate 70 is secured to a stationary part of the vehicle and carries a pressure plate 71 which is normally spaced therefrom and is secured for limited axial and circumferential movement relative thereto by a plurality of resilient torque arms 72 as previously described in connection with Figs. 1 and 2. The pressure plate 71 in the present embodiment is provided with a plurality of extending lugs 73 forming spaced bearing surfaces.

The pressure plate 71 is moved toward the backing plate 70 by actuation of a yoke 74 which is pivotally mounted on brackets 75 which are adjustably secured to the backing plate 70 in the same manner as that previously described in connection with the brackets 30 shown in Figs. 1, 2 and 4. Extending arms 76 and 77, each having opposite ends in contact wtih the lugs 73 provided on the pressure plate 71, are connected with the terminal end of the yoke 74, the member 76 being pivotally connected therewith by a link 78 and the member 77 being pivotally connected therewith by a link 79. By this construction it will be seen that the leverage which is exerted upon the members 76 and 77 is multiplied by the links 78 and 79 and the pivotal connection of the links with the ends of the yoke 74 removed from the pivoting points thereof. Upon movement of the top of the yoke member 74 in a direction away from the backing plate 70, the leverage exerts a pressure on the members 76 and 77 and these pressures are distributed over these members to the lugs 73 provided on the pressure plate 71. This causes the pressure plate 71 to move in response to the braking pressures toward the backing plate 70. In this arrangement it will be seen that the braking pressures are distributed to a plurality, in this instance, four, of separate points substantially evenly distributed over the surface of the pressure plate 71 and thus the pressure plate is moved toward the backing plate with a substantially uniform distribution of the braking forces thereon and thus the tendency of the plate to warp or bend is largely eliminated.

The movement of the yoke 74 in order to apply the braking pressures on the pressure plate 71 may be effected by any suitable brake applying means such, for example, as the hydraulic cylinder 80 which is similar in construction to that previously described in connection with the embodiment shown in Figs. 1 and 2. In the present instance, however, the stud 39 contacts the face of the yoke 74 directly and pushes it outwardly and away from the backing plate instead of actuating a rocker member such as the rocker member 40 previously described. It is to be understood that the actuation of the yoke may be by a mechanical means similar to that previously described in connection with Figs. 1, 2 and 3, which may be used either alone or selectively with the hydraulic brake applying mechanism such as that previously described.

The construction of the backing plate 70 here shown differs from the construction previously described in that the backing plate 70 is formed as a cast annulus of any desired shape and size of cross section to give it sufficient strength to withstand without warping the braking pressures to be applied thereto. In order to seal the brake from foreign material such as dust, dirt, water, oil, etc., a stamped metal guard 81 is secured to the center portion of the cast annulus and extends into spaced engagement with the groove 82 provided on the hub 60 and is spaced therefrom a sufficient distance to permit the free rotation of the hub without causing rotation of the guard 81.

Thus it will be seen that a brake embodying the present inventiton possesses all of the advantages which are commonly associated with brakes of the disk type, namely, increased braking surface area for a brake of a given diameter over the area available in a conventional shoe and drum type of brake, the ready adjustment and uniform application of the braking pressures over the braking surface areas. In addition, the disk brake of the present invention permits the use of a relatively light backing plate and provides for the resilient mounting of the friction disk between the pressure plate and the backing plate. The brake is readily cooled and is of a simplified construction which may be readily serviced and adjusted. The brake is also positive in its operation and upon test has been shown to possess a relatively long operating service life with the minimum of required adjustments.

I claim:

1. A vehicle brake comprising a stationary backing plate, a spaced pressure plate carried by said backing plate, a plurality of curved resilient relatively elongated steel strap links forming resilient torque arms secured to said backing plate and said pressure plate and adapted to resiliently oppose a decrease in the spacing between said backing plate and said pressure plate, a friction disk driven by a rotating hub and interposed in the space between said pressure plate and said backing plate, opposite ends of each of said links being respectively connected to said pressure plate and said backing plate on opposite sides of said disk, and brake applying means for moving said pressure plate toward said backing plate and into frictional braking engagement with said friction disk and comprising a pivotally mounted yoke secured to said backing plate and operable on said pressure plate to move said pressure plate in the direction of said backing plate, and actuating mechanism connected with said yoke and adapted to effect pivotal movement of said yoke on said backing plate, said links permitting limited circumferential movement of said pressure plate relative to said backing plate on engagement of the pressure plate and friction disk.

2. A vehicle brake comprising a stationary backing plate, a spaced pressure plate carried by said backing plate, a plurality of curved resilient relatively elongated steel strap links forming resilient torque arms each of which is respectively secured at its opposite ends to said backing plate and said pressure plate and adapted to resiliently oppose a decrease in the spacing between said backing plate and said pressure plate, an annular friction disk driven by a rotating hub and interposed in the space between said pressure plate and said backing plate so that said links pass through the open center thereof, and brake applying means for moving said pressure plate toward said backing plate and into frictional braking engagement with said friction disk and comprising a pivotally mounted yoke secured to said backing plate and operable at a plurality of spaced points on said pressure plate to move said pressure plate in the direction of said backing plate, and actuating mechanism connected with said yoke and adapted to effect pivotal movement of said yoke on said backing plate, said links permitting limited circumferential movement of said pressure plate relative to said backing plate on engagement of the pressure plate and friction disk.

3. A vehicle brake comprising a stationary backing plate, a spaced pressure plate carried by said backing plate, a plurality of resilient steel strap links forming resilient torque arms secured to said backing plate and said pressure plate and adapted to resiliently oppose a decrease in the spacing between said backing plate and said pressure plate, a friction disk driven by a rotating hub and interposed in the space between said pressure plate and said backing plate, and brake applying means for moving said pressure plate toward said backing plate and into frictional braking engagement with said friction disk and comprising a pivotally mounted yoke secured to said backing plate and operable on said pressure plate to move said pressure plate in the direction of said backing plate, and actuating mechanism comprising hydraulic and mechanical brake operating systems connected with said yoke and operable selectively to move said yoke pivotally on said backing plate and to thereby move said pressure plate into braking engagement with said friction disk and to apply braking pressures thereon.

4. A vehicle brake comprising a stationary backing plate, a spaced pressure plate carried by said backing plate, a plurality of resilient steel strap links forming resilient torque arms secured to said backing plate and said pressure plate and adapted to resiliently oppose a decrease in the spacing between said backing plate and said pressure plate, a friction disk driven by a rotating hub and interposed in the space between said pressure plate and said backing plate, and brake applying means for moving said pressure plate toward said backing plate and into frictional braking engagement with said friction disk and comprising a pivotally mounted yoke secured to said backing plate and operable at a plurality of spaced points on said pressure plate to move said pressure plate in the direction of said backing plate, and actuating mechanism comprising hydraulic and mechanical brake operating systems connected with said yoke and operable selectively to move said yoke pivotally on said backing plate and to thereby move said pressure plate into braking engagement with said friction disk and to apply braking pressures thereon.

5. A vehicle brake comprising a stationary backing plate, a spaced pressure plate carried by said backing plate for resilient movement axially and circumferentially relative to the backing plate, a friction disk driven by a rotating hub and interposed in the space between said pressure plate and said backing plate, and brake applying means for moving said pressure plate toward said backing plate and into frictional braking engagement with said friction disk and comprising a pivotally mounted yoke secured to said backing plate and operable on said pressure plate to move said pressure plate in the direction of said backing plate, and actuating mechanism comprising hydraulic and mechanical brake operating systems connected with said yoke and operable selectively to move said yoke pivotally on said backing plate and to thereby move said pressure plate into braking engagement with said friction disk and to apply braking pressures thereon.

6. A vehicle brake comprising a stationary backing plate, a spaced pressure plate carried by said backing plate for resilient movement axially and circumferentially relative to the backing plate, a friction disk driven by a rotating hub and interposed in the space between said pressure plate and said backing plate, and brake applying means for moving said pressure plate toward said backing plate and into frictional braking engagement with said friction disk and comprising a pivotally mounted yoke secured to said backing plate and operable at a plurality of spaced points on said pressure plate to move said pressure plate in the direction of said backing plate, and actuating mechanism comprising hydraulic and mechanical brake operating systems connected with said yoke and operable selectively to move said yoke pivotally on said backing plate and to thereby move said pressure plate into braking engagement with said friction disk and to apply braking pressures thereon.

7. A vehicle brake comprising a stationary backing plate, a spaced pressure plate carried by said backing plate, a plurality of resilient steel strap links forming resilient torque arms secured to said backing plate and said pressure plate and adapted to resiliently oppose a decrease in the spacing between said backing plate and said pressure plate, a friction disk driven by a rotating hub and resiliently suspended in the space between said pressure plate and said backing plate, and brake applying means for moving said pressure plate toward said backing plate and into frictional braking engagement with said friction disk and comprising a pivotal yoke adjustably mounted on said backing plate for pivotal movement relative thereto and adapted upon such pivotal movement to cause a decrease of spacing between said pressure plate and said backing plate, and separate brake actuating systems connected with said yoke and selectively operable to provide for mechanical or hydraulic actuation thereof.

8. A vehicle brake comprising a stationary backing plate, a spaced pressure plate carried by said backing plate, a plurality of resilient steel strap links forming resilient torque arms secured to said backing plate and said pressure plate and adapted to resiliently oppose a decrease in the spacing between said backing plate and said pressure plate, a friction disk driven by a rotating hub and resiliently suspended in the space between said pressure plate and said backing plate, and brake applying means for moving said pressure plate toward said backing plate and into frictional braking engagement with said friction disk and comprising a pivotal yoke adjustably mounted on said backing plate for pivotal movement relative thereto and adapted upon such pivotal movement to cause a decrease of spacing between said pressure plate and said backing plate, rocker arm members mounted on said yoke and adapted to transfer forces generated by movement of said yoke to a plurality of spaced points on said pressure plate, and separate brake actuating systems connected with said yoke and selectively operable to provide for mechanical or hydraulic actuation thereof.

9. A vehicle brake comprising a rotatable friction disk, a fixed backing plate and a pressure plate disposed in spaced relation on opposite sides of said disk, a plurality of resilient curved links each of which is secured on opposite sides of said disk to said backing plate and said pressure plate, said links being adapted to maintain the spacing of said pressure plate from said disk and backing plate while permitting limited axial and circumferential movement of said pressure plate relative to said backing plate upon the application of braking forces thereon, and force applying means for moving said pressure plate axially relative to said backing plate to establish a frictional braking engagement between said plates and said disk.

10. A vehicle brake comprising a rotatable friction disk, a fixed backing plate and a pressure plate disposed in spaced relation on opposite sides of said disk, a plurality of resilient torque arms secured to said backing plate and said pressure plate and adapted to maintain the spacing thereof while permitting limited axial and circumferential movement of said pressure plate relative to said backing plate upon the application of braking forces thereon, and force applying means adapted for selective hydraulic or mechanical actuation for moving said pressure plate axially relative to said backing plate to establish a frictional braking engagement between said plates and said disk, said backing plate being provided with a circumferentially bowed portion adjacent the braking surface.

11. A vehicle brake comprising a rotatable friction disk, a fixed backing plate and a pressure plate disposed in spaced relation on opposite sides of said disk, a plurality of resilient torque arms secured to said backing plate and said pressure plate and adapted to maintain the spacing thereof while permitting limited axial and circumferential movement of said pressure plate relative to said backing plate upon the application of braking forces thereon, and force applying means adapted for selective hydraulic or mechanical actuation for moving said pressure plate axially relative to said backing plate to establish a frictional braking engagement between said plates and said disk and comprising a yoke pivotally mounted on said backing plate and operable on said pressure plate to move said pressure plate relative to said backing plate, and actuating mechanism for moving said yoke comprising hydraulic and mechanical brake operating systems connected with said yoke and operable selectively to move said yoke and apply a braking pressure on said pressure plate to move said pressure plate into braking engagement with said friction disk.

12. A vehicle brake comprising a stationary backing plate, a spaced pressure plate carried by said backing plate, a plurality of resilient steel strap links forming resilient torque arms secured to said backing plate and said pressure plate and adapted to resiliently oppose a decrease in the spacing between said backing plate and said pressure plate, a friction disk driven by a rotating hub and interposed in the space between said pressure plate and said backing plate, and brake applying means for moving said pressure plate toward said backing plate and into frictional braking engagement with said friction disk, said applying means including a yoke pivotally mounted on the backing plate a pair of arms arranged to contact opposite sides of the pressure plate, each of said arms being adapted to contact said plate at a plurality of points, and a link connecting each arm with the yoke.

13. A vehicle brake comprising a stationary backing plate, a spaced pressure plate carried by said backing plate, a plurality of resilient steel strap links forming resilient torque arms secured to said backing plate and said pressure plate and adapted to resiliently oppose a decrease in the spacing between said backing plate and said pressure plate, a friction disk driven by a rotating hub and interposed in the space between said pressure plate and said backing plate, and brake applying means for moving said pressure plate toward said backing plate and into frictional braking engagement with said friction disk, said applying means including a member pivotally mounted on said backing plate, a plurality of additional members each of which is arranged to contact a different portion of the pressure plate from that contacted by the other additional member or members and each of which contacts said plate at a plurality of points, and links connecting said pivotally mounted member with said additional members, whereby on operation of said pivotally mounted members the additional members contact the pressure plate at said points for bringing the pressure plate into engagement with the friction disk while maintaining said plate in substantial alignment with said disk.

14. A vehicle brake comprising a backing plate, a resiliently mounted pressure plate carried by and spaced from said backing plate, a rotatable friction disk driven from the vehicle hub and interposed in the space between said pressure plate and said backing plate, and brake applying means for moving said pressure plate toward said backing plate and into frictional braking engagement with said friction disk, said applying means including a member pivotally mounted on said backing plate, additional members each of which is adapted to contact a part of said pressure plate spaced from the part thereof contacted by the other additional member or members, and links connecting said pivotally mounted member with said additional member or members, whereby operation of said pivotally mounted member brings said additional members into contact with the pressure plate for engaging said plate with the friction disk while maintaining the pressure plate and friction disk in substantial alignment.

JOSEPH M. MILAN.